US008931143B2

(12) United States Patent
Nakamura

(10) Patent No.: US 8,931,143 B2
(45) Date of Patent: Jan. 13, 2015

(54) HOSE CLAMP

(75) Inventor: Yuji Nakamura, Aichi (JP)

(73) Assignee: Togo Seisakusyo Corporation, Aichi-Ken (JP)

(*) Notice: Subject to any disclaimer, the term of this patent is extended or adjusted under 35 U.S.C. 154(b) by 0 days.

(21) Appl. No.: 13/979,365

(22) PCT Filed: Jan. 14, 2011

(86) PCT No.: PCT/JP2011/050540
§ 371 (c)(1),
(2), (4) Date: Jul. 11, 2013

(87) PCT Pub. No.: WO2012/095989
PCT Pub. Date: Jul. 19, 2012

(65) Prior Publication Data
US 2014/0068897 A1 Mar. 13, 2014

(51) Int. Cl.
F16L 33/03 (2006.01)
(52) U.S. Cl.
CPC ............................ F16L 33/03 (2013.01)
USPC ............................ 24/20 S; 24/20 R; 24/23 R
(58) Field of Classification Search
USPC ......... 24/20 R, 23 R, 22, 23 W, 20 CW, 20 S, 24/20 EE, 23 EE
See application file for complete search history.

(56) References Cited

U.S. PATENT DOCUMENTS

| 5,819,376 A | 10/1998 | Kovalsky et al. |
| 6,438,801 B1 | 8/2002 | Yamada |
| 2010/0083472 A1 | 4/2010 | Nakamura |

FOREIGN PATENT DOCUMENTS

| JP | 61-19192 U | 2/1986 |
| JP | 62-184281 U | 11/1987 |
| JP | 2-5692 U | 1/1990 |
| JP | 10-073193 A | 3/1998 |
| JP | 2001-012670 A | 1/2001 |
| JP | 2001-090886 A | 4/2001 |
| JP | 2001-280566 A | 10/2001 |
| WO | WO 2008126754 A1 * | 10/2008 |

* cited by examiner

Primary Examiner — Robert J Sandy
Assistant Examiner — Abigail Morrell
(74) Attorney, Agent, or Firm — Christensen Fonder PA

(57) ABSTRACT

A hose clamp for preventing a leak during tightening of a hose includes a clamp body with a strip-shaped leaf spring having an annular shape, and a pair of operation pieces. The clamp body maintained in a diameter expansion state by a locking claw of the operation piece engaged with an engagement concavity of the operation piece of the clamp body. The locking claw is released by bringing the operation piece on one side close to the operation piece on the other side and moving the operation piece on one side with respect to the operation piece on the other side in the opposing direction in an axial direction of the clamp body, reducing the clamp body in diameter. A leak prevention piece presses a hose during tightening of the hose at an end portion of the operation piece on the other side of the clamp body.

9 Claims, 5 Drawing Sheets

HOSE CLAMP

PRIORITY CLAIM

The present application is a National Phase entry of PCT Application No. PCT/JP2011/050540, filed Jan. 14, 2011, the disclosure of which is hereby incorporated by reference herein in its entirety.

TECHNICAL FIELD

The present invention relates to a hose clamp tightening a hose or the like made of rubber to a connection pipe, and in particular to a hose clamp of a so-called holder-less type in which it is possible to maintain a diameter expansion state thereof without using a holder.

BACKGROUND ART

A hose clamp according to an example of the related art (refer to JP-A-2001-280566, for example) will be described. FIG. 16 is a perspective view showing the hose clamp.

As shown in FIG. 16, a hose clamp 100 includes a clamp body 101 formed by bending a metal strip into an annular shape, tapered portions 106 extending toward a central portion from both end portion of the clamp body 101 in a state of crossing each other in a width direction (an axial direction of the clamp body 101), and a pair of operation pieces 102A and 102B standing up in a radial direction from tips of the tapered portions 106. When the clamp body 101 is reduced in diameter, tightening of a hose (not shown) is made possible. Further, when both the operation pieces 102A and 102B are brought close to each other, the clamp body 101 is expanded in diameter. Further, a locking claw 103 is raised from the clamp body 101 near the operation piece 102A on one side. Further, on a side of the operation piece 102B on the other side, a receiving portion 104 with which the locking claw 103 is engaged so as to be capable of being disengaged is formed and also a cut-out portion 105 which allows axial overlap of the clamp body 101 with the operation piece 102A on one side to be avoided at the time of a diameter expansion is formed.

The clamp body 101 is maintained in a diameter expansion state by bringing both the operation pieces 102A and 102B of the hose clamp 100 close to each other in a circumferential direction by a pair of pliers and then making the locking claw 103 be engaged with the receiving portion 104. Further, if the hose is inserted into the clamp body 101 which is in the diameter expansion state and both the operation pieces 102A and 102B are brought close to each other in an axial direction (a width direction) of the clamp body 101 by a pair of pliers, both the operation pieces 102A and 102B are shifted in the width direction by an amount equivalent to the width of the cut-out portion 105, whereby the engagement of the locking claw 103 with the receiving portion 104 is released. Then, the clamp body 101 tightens the hose due to diameter reduction by an elastic restoring force.

SUMMARY OF THE INVENTION

Technical Problem

According to the hose clamp 100 of the example of the related art, during tightening of the hose, a gap 100S is present between both end portions of the clamp body 101, that is, between the tapered portions 106. The gap 100S is a gap which is spirally continuous in the circumferential direction and in which both end portions in the circumferential direction are opened. Therefore, a portion which is not tightened to the hose by the clamp body 101, that is, a portion in which surface pressure is low is generated in the gap 100S between both end portions of the clamp body 101. For this reason, there is a problem in that at the portion in which the surface pressure is low, the hose is easily swelled by internal fluid pressure, and thus a leak flow path in which fluid in the hose is leaked to the outside is generated.

Accordingly, there has been a need for an improved hose clamp.

BRIEF SUMMARY OF THE INVENTION

That is, according to a first aspect of the invention, there is provided a hose clamp including: a clamp body formed by bending a strip-shaped leaf spring material into an annular shape; and a pair of operation sections standing up in a radial direction from both end portions of the clamp body, wherein tightening of a hose is made possible by diameter reduction by an elastic restoring force of the clamp body, the clamp body is expanded in diameter by using elastic deformation by bringing the pair of operation sections close to each other, a locking section is formed on a side of the operation section on one side of the clamp body, an engagement portion with which the locking section is engaged so as to be capable of being disengaged is formed on a side of the operation section on the other side of the clamp body, the clamp body is maintained in a diameter expansion state by engagement of the locking section with the engagement portion, when the clamp body is reduced in diameter from the diameter expansion state, the engagement of the locking section with the engagement portion is released by bringing the operation section on one side close to the operation section on the other side and moving the operation section on one side with respect to the operation section on the other side in the opposing direction in an axial direction of the clamp body, and a leak prevention section which approximately comes into contact with an area between both end portions of the clamp body in the axial direction of the clamp body and presses the hose during tightening of the hose is provided. With such a configuration, the clamp body is maintained in the diameter expansion state, a so-called temporarily assembled state, by making the locking section on the side of the operation section on one side be engaged with the engagement portion on the side of the operation section on the other side. Further, if in a state where the hose is inserted in the clamp body which is in the temporarily assembled state, engagement of the locking section with the engagement portion is released by bringing the operation section on one side close to the operation section on the other side, the clamp body is reduced in diameter by elastic restoring force thereof. In this way, the hose is tightened by the elastic restoring force of the clamp body. Then, during tightening of the hose, both end portions of the clamp body approximately come into contact with each other in the axial direction of the clamp body with the leak prevention section interposed therebetween and the leak prevention section presses the hose. Therefore, a leak flow path which is generated in a portion in which surface pressure by the clamp body is low in the gap between both end portions of the clamp body in the hose can be shut off by pressing of the leak prevention section. In this way, leak of fluid in the hose which is generated during tightening of the hose can be prevented. In addition, the expression "approximately come into contact with" as referred to in this specification means coming into contact with or coming close to.

Further, according to a second aspect of the invention, the leak prevention section is configured by a leak prevention piece which protrudes to a facing side edge on the side of the operation section on one side in the side of the operation section on the other side and has a tip edge extending in a circumferential direction, and a contact portion which is formed at an edge on a side facing the side of the operation section on the other side in the side of the operation section on one side and can come into contact with the tip edge of the leak prevention piece in the form of at least point contact. With such as configuration, during tightening of the hose, the contact portion on the side of the operation section on one side approximately comes into contact with the tip edge of the leak prevention piece on the side of the operation section on the other side of the clamp body in the form of at least point contact and the leak prevention piece presses the hose. Therefore, leak of fluid in the hose which is generated during tightening of the hose can be prevented by the leak prevention section configured by the leak prevention piece and the contact portion. In addition, the form of one point or plural-point contact or the form of line contact is included the expression "the form of at least point contact" as referred to in this specification.

Further, according to a third aspect of the invention, an expansion restricting section which restricts expansion in the opposing direction in the axial direction of the clamp body of the side of the operation section on one side with respect to the side of the operation section on the other side at the time of release of the engagement of the locking section with the engagement portion is provided between the side of the operation section on one side and the side of the operation section on the other side of the clamp body. With such a configuration, at the time of release of the engagement of the locking section with the engagement portion, expansion in the opposing direction in the axial direction of the clamp body of the side of the operation section on one side with respect to the side of the operation section on the other side is restricted by the expansion restricting section provided between the side of the operation section on one side and the side of the operation section on the other side of the clamp body. For this reason, an assembly defect of the clamp body due to oblique assembly of the clamp body to the hose or enlargement of the gap between both end portions of the clamp body 12 is prevented, and thus leak of fluid in the hose due to the assembly defect can be prevented.

Further, according to a fourth aspect of the invention, all the pair of operation sections is formed in a one-foot form. With such a configuration, the hose clamp can be made more compact in the axial direction of the clamp body, compared to a case where an operation section on one side is formed in a one-foot form and an operation section on the other side is formed in a two-foot form.

DETAILED DESCRIPTION OF THE INVENTION

Figure 1:
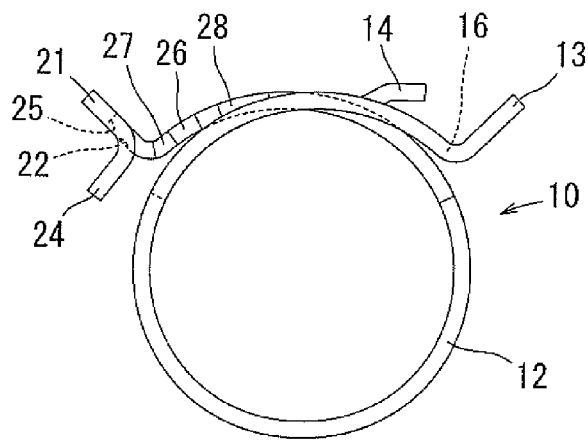
FIG. 1 is a front view showing a free state of a hose clamp according to an embodiment.

Hereinafter, a mode for carrying out the invention will be described using the drawings. FIG. 1 is a front view showing a free state of a hose clamp and FIG. 2 is a development diagram of the hose clamp.

Figure 2:
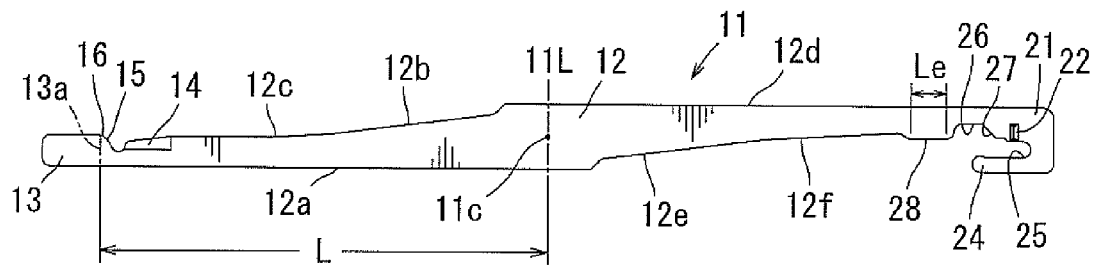
FIG. 2 is a development diagram of the hose clamp.

As shown in FIG. 2, a blank 11 made of a strip-shaped metallic plate spring material is formed by press-forming on the basis of the developed shape of a hose clamp, and a hose clamp 10 (refer to FIG. 1) is formed by bending-forming the blank 11. In addition, in FIG. 2, reference numerals equivalent to the respective sections of the hose clamp 10 are given.

As shown in FIG. 1, the hose clamp 10 is configured to include a clamp body 12 which is formed by bending a main body section of the blank 11 into an annular shape, and a pair of operation pieces 13 and 21 which are formed by bending both end portions of the blank 11 into a shape in which the operation pieces 13 and 21 stand up radially outward from both end portions of the clamp body 12. Each of both the operation pieces 13 and 21 is formed in a one-foot form. Further, when both the operation pieces 13 and 21 are brought close to each other, the clamp body 12 is expanded in diameter by using elastic deformation thereof. Further, when the clamp body 12 is reduced in diameter from a diameter expansion state by elastic restoring force thereof, tightening of a hose is possible. In addition, both the operation pieces 13 and 21 are respectively equivalent to "operation sections" as referred to in this specification. Further, for convenience of description, the operation piece 13 on one side is referred to as a "first operation piece 13" and the operation piece 21 on the other side is referred to as a "second operation piece 21". Further, a direction in the hose clamp 10 is set to be defined on the basis of the front view of FIG. 1. Further, the front-back direction of the clamp body 12 is equivalent to an "axial direction" or a "width direction".

The clamp body 12 is formed so as to have a shape in which gradual tapers are made tapered toward end portions of the respective operation pieces 13 and 21 sides from a central portion in a circumferential direction thereof. Specifically, as shown in FIG. 2, in the blank 11, a front edge 12a of a half body portion on the first operation piece 13 side of the clamp body 12 is formed in a straight line shape perpendicular to a center line 11L of the blank 11. Further, a rear edge of the half body portion on the first operation piece 13 side of the clamp body 12 is formed in a two-step tapered shape having a base-side tapered portion 12b and a tip-side tapered portion 12c which extend toward a tip portion side on the first operation piece 13 side from the vicinity of the central portion of the clamp body 12. The base-side tapered portion 12b and the tip-side tapered portion 12c form the rear edge into a concave shape. That is, the tip-side tapered portion 12c has a gently tapered shape, compared to the base-side tapered portion 12b. Further, a half body portion on the second operation piece 21 side of the clamp body 12 is formed in a point symmetrical shape with a center point 11 C of the blank 11 as the center, with respect to the half body portion on the first operation piece 13 side of the clamp body 12. For this reason, at the half body portion on the second operation piece 21 side of the clamp body 12, a rear edge 12d having a straight line shape perpendicular to the center line 11L of the blank 11 and a front edge having a two-step tapered shape having a base-side tapered portion 12e and a tip-side tapered portion 12f which extend toward a tip portion side on the second operation piece 21 side from the vicinity of the central portion of the clamp body 12 are formed. Further, the second operation piece 21 is formed in a wide width shape having a front edge which is located on the same plane as the front edge 12a of the half body portion on the first operation piece 13 side of the clamp body 12.

By forming the clamp body 12 so as to have a shape in which gradual tapers are made toward the end portions on the respective operation pieces 13 and 21 sides from the central portion, it is possible to make the shape of the clamp body 12 close to a shape that conforms to the Castigliano's theorem. For this reason, it is possible to improve roundness associated with a change in the inner diameter of the clamp body 12, thereby equalizing surface pressure distribution. In addition, each of the rear edge of the half body portion on the first operation piece 13 side of the clamp body 12 and the front edge of the half body portion on the second operation piece 21 side of the clamp body 12 is not limited to the two-step tapered shape and may be formed in a one-step tapered shape.

As shown in FIG. 1, when the clamp body 12 has been bent and formed in an annular shape, the rear edge of the half body portion on the first operation piece 13 side and the front edge of the half body portion on the second operation piece 21 side face each other in a state of crossing each other in the axial direction (the width direction) of the clamp body 12. That is, the clamp body 12 is bent and formed in a hollow cylindrical shape so as to enter a state where an end portion on the first operation piece 13 side is located on the front side (the front side of the plane of paper in FIG. 1) of an end portion on the second operation piece 21 side. Further, in a free state (refer to FIG. 1) of the hose clamp 10, both the operation pieces 13 and 21 enter neutral states in which the operation pieces 13 and 21 face each other in a state of forming a shape in which the operation pieces 13 and 21 are parallel to each other. Further, in the free state of the hose clamp 10, the gap between the rear edge of the end portion on the first operation piece 13 side and the front edge of the end portion on the second operation piece 21 side which face each other in the axial direction of the clamp body 12 becomes the smallest. In addition, FIG. 3 is a perspective view showing a peripheral portion of the first operation piece and FIG. 4 is a perspective view showing a peripheral portion of the second operation piece.

Figure 3:
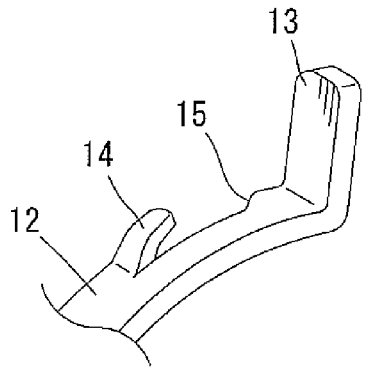
FIG. 3 is a perspective view showing a peripheral portion of a first operation piece.

As shown in FIG. 3, a locking claw 14 is formed at a rear side portion of the end portion on the first operation piece 13 side in the clamp body 12. The locking claw 14 is formed by a radially outward inclined cut and raised portion of the clamp body 12. In addition, the locking claw 14 is equivalent to a "locking section" as referred to in this specification.

Further, a guide edge 15 which is located on the first operation piece 13 side with respect to the locking claw 14 is formed at the rear side portion of the end portion on the first operation piece 13 side in the clamp body 12. The guide edge 15 is obliquely formed with a predetermined gradient such that the width (the width in the front-back direction) of the end portion on the first operation piece 13 side of the clamp body 12 is narrow on the base side and becomes wide on the tip side (the first operation piece 13 side).

Figure 4:
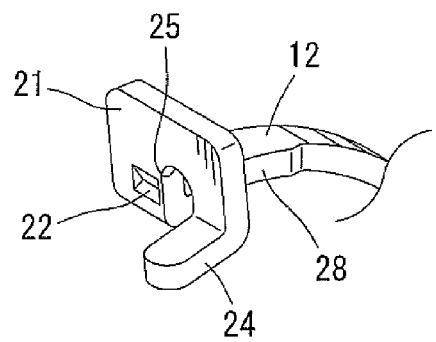
FIG. 4 is a perspective view showing a peripheral portion of a second operation piece.

As shown in FIG. 4, an engagement concavity 22 is formed in the outer surface (the surface on the opposite side to the first operation piece 13) of the second operation piece 21.

The engagement concavity 22 is formed such that the locking claw 14 (refer to FIG. 3) can be engaged therewith so as to be capable of being disengaged. In addition, the engagement concavity 22 is equivalent to an "engagement portion" as referred to in this specification. Further, it is acceptable if the engagement concavity 22 has a shape to prevent a position shift in an engagement release direction of at least the locking claw 14 and a position shift of the locking claw 14 to the inside in a radial direction of the clamp body 12.

At a front side portion of the second operation piece 21, an expansion restricting piece 24 protruding in the opposing direction with respect to the first operation piece 13 in the clamp body 12 side is formed by an L-shaped bend. Further, an opening groove 25 having an inverse U-shaped groove shape is formed between the engagement concavity 22 side and the expansion restricting piece 24 side of the second operation piece 21. Further, in the free state of the hose clamp 10, that is, a neutral state in which both the operation pieces 13 and 21 face each other, the opening groove 25 and the locking claw 14 are aligned with each other in the axial direction of the clamp body 12. In addition, the expansion restricting piece 24 and the locking claw 14 configures an "expansion restricting section" as referred to in this specification.

As shown in FIG. 1, a receiving groove 26 (refer to FIG. 2) having a concave groove shape is formed in the front side portion of the end portion on the second operation piece 21 side in the clamp body 12. A groove wall on the second operation piece 21 side of the receiving groove 26 becomes a guide edge 27. The guide edge 27 is obliquely formed with a predetermined gradient such that the width (the width in a transverse direction) of the end portion on the second operation piece 21 side of the clamp body 12 is narrow on the base side and becomes wide on the tip side (the second operation piece 21 side). Further, the guide edge 27 is formed such that the guide edge 27 can come into contact with and slide on the guide edge 15 on the first operation piece 13 side. In addition, both the guide edges 15 and 27 configure a "guide mechanism" as referred to in this specification.

A leak prevention piece 28 (FIG. 2) which is located on the base side with respect to the receiving groove 26 protrudes from the front edge (a facing side edge) of the end portion on the second operation piece 21 side in the clamp body 12. A front end edge (a tip edge) of the leak prevention piece 28 is formed in a straight line shape having a predetermined length Le (refer to FIG. 2) and extending in a circumferential direction. Further, a contact portion (denoted by reference numeral 16) set between the guide edge 15 of the rear edge (the facing side edge) of the end portion on the first operation piece 13 side in the clamp body 12 in a hose tightening state (described later) of the hose clamp 10 and a base end portion (a bending termination portion of the clamp body 12) 13a of the first operation piece 13 can come into contact with the tip edge of the leak prevention piece 28 in the form of point contact. In addition, the leak prevention piece 28 and the contact portion 16 configure a "leak prevention section" as referred to in this specification.

Next, a case of tightening a hose by using the hose clamp 10 will be described.

Figure 5:
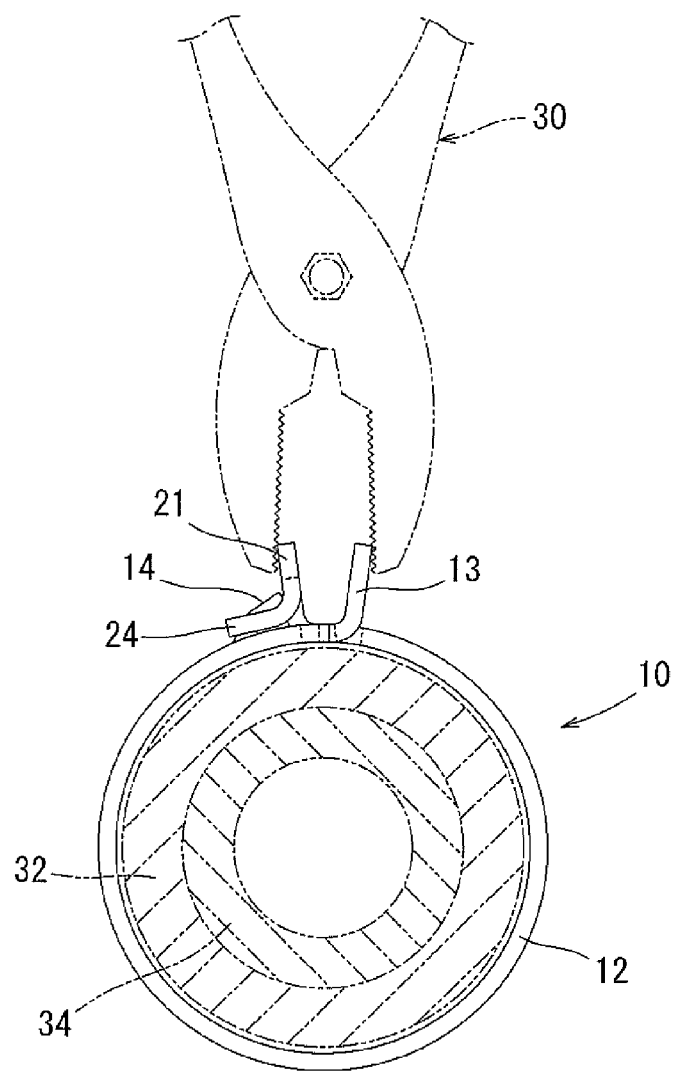
FIG. 5 is a front view showing a temporarily assembled state of the hose clamp.

First, both the operation pieces 13 and 21 of the hose clamp 10 (refer to FIG. 1) in the free state are gripped by a tool 30 (refer to FIG. 5) such as a pair of pliers or a pair of pincers and brought close to each other by using elastic deformation of the clamp body 12. In this way, the clamp body 12 is expanded in diameter and the locking claw 14 on the first operation piece 13 side passes through the opening groove 25 of the second operation piece 21. Then, grip of both the operation pieces 13 and 21 by the tool 30 is released in a state (a position-shifted state) where the first operation piece 13 is offset with respect to the second operation piece 21 in the opposite direction, that is, in the rear (backward in the plane of paper in FIG. 1) in the axial direction by using the elastic deformation of the clamp body 12. Then, the locking claw 14 on the first operation piece 13 side is engaged with the engagement concavity 22 of the second operation piece 21 with the elastic restoring force of the clamp body 12 (refer to FIG. 7). In this way, the clamp body 12 is maintained in a diameter expansion state (refer to FIGS. 5 to 7). This state is referred to as a temporarily assembled state of the hose clamp 10. In addition, FIG. 5 is a front view showing the temporarily assembled state of the hose clamp, FIG. 6 is a plan view of the same, and FIG. 7 is a perspective view likewise showing the peripheral portions of both the operation pieces.

Figure 6:
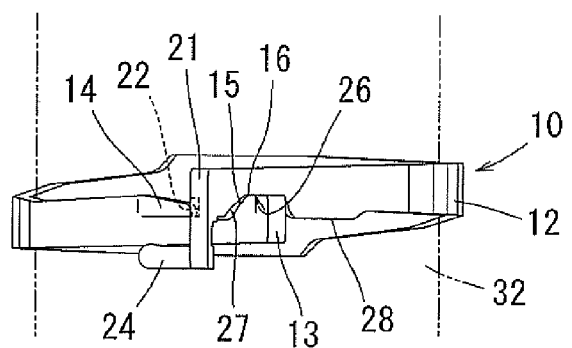
FIG. 6 is a plan view showing the temporarily assembled state of the hose clamp.
Figure 7:
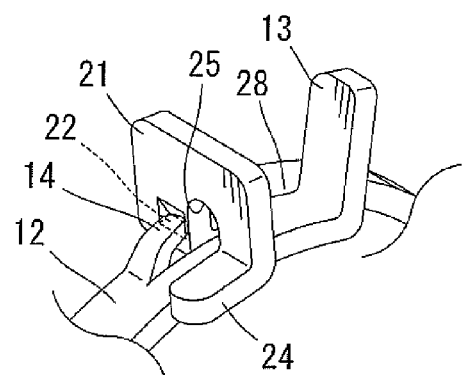
FIG. 7 is a perspective view showing the peripheral portions of both the operation pieces in the temporarily assembled state.

As shown in FIG. 6, in the temporarily assembled state of the hose clamp 10, the rear half portion which includes the guide edge 15 of the end portion on the first operation piece 13 side in the clamp body 12 is fitted into the receiving groove 26 on the second operation piece 21 side and the guide edge 27 of the receiving grove 26 and the guide edge 15 on the first operation piece 13 side are brought close to each other. In addition, the hose clamp 10 is carried into a working site related to tightening work of a hose in, for example, the temporarily assembled state. Further, the hose clamp 10 may be carried into a working site in the free state and then temporarily assembled at the working site.

Next, in the working site related to the tightening work of the hose, a hose 32 is inserted into the clamp body 12 of the hose clamp 10 which is in the temporarily assembled state (refer to FIG. 5), and after the hose 32 is fitted to a connection pipe 34 by using elastic deformation of the hose 32, the hose clamp 10 is located at a fastening portion of the hose 32 to the connection pipe 34. Then, both the operation pieces 13 and 21 of the hose clamp 10 are gripped by the tool 30 such as a pair of pliers or a pair of pincers and brought close to each other by using the elastic deformation of the clamp body 12 (refer to FIG. 8). Here, FIG. 8 is a plan view showing a temporary assembly release state.

Figure 8:
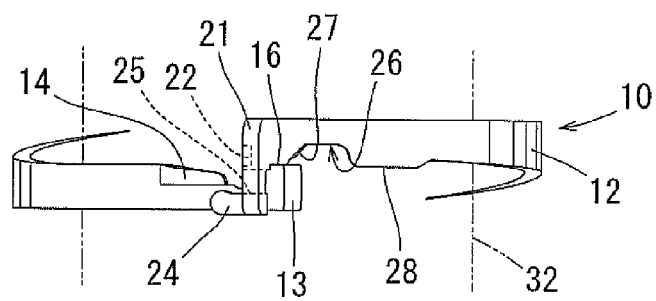
FIG. 8 is a plan view showing a temporary assembly release state.

Then, as shown in FIG. 8, as the locking claw 14 on the first operation piece 13 side breaks away from the engagement concavity 22 of the second operation piece 21, the first operation piece 13 is pushed in the opposing direction, that is, forward (downward in FIG. 8) in the axial direction of the clamp body 12 with respect to the second operation piece 21 due to sliding contact of the guide edge 15 (refer to FIG. 6) on the first operation piece 13 side with respect to the guide edge 27 on the second operation piece 21 side. Further, also by the elastic restoring force due to offset of the first operation piece 13 with respect to the second operation piece 21, a so-called offset reaction force, the first operation piece 13 is pushed in the opposing direction, that is, forward (downward in FIG. 8) in the axial direction of the clamp body 12 with respect to the second operation piece 21. In this way, the first operation piece 13 faces or approximately faces the second operation piece 21 and the opening groove 25 of the second operation piece 21 and the locking claw 14 on the first operation piece 13 side are aligned or approximately aligned with each other in the axial direction of the clamp body 12.

Subsequently, if the grip of both the operation pieces 13 and 21 by the tool 30 (refer to FIG. 5) is released, the clamp body 12 is reduced in diameter due to elastic restoring force thereof. At this time, the locking claw 14 on the first operation piece 13 side passes through the opening groove 25 of the second operation piece 21. Further, the clamp body 12 which is reduced in diameter due to the elastic restoring force tightens the hose 32 to the connection pipe 34 (refer to FIG. 9). In addition, FIG. 9 is a front view showing a hose tightening state of the hose clamp, and FIG. 10 is a plan view of the same.

Figure 9:
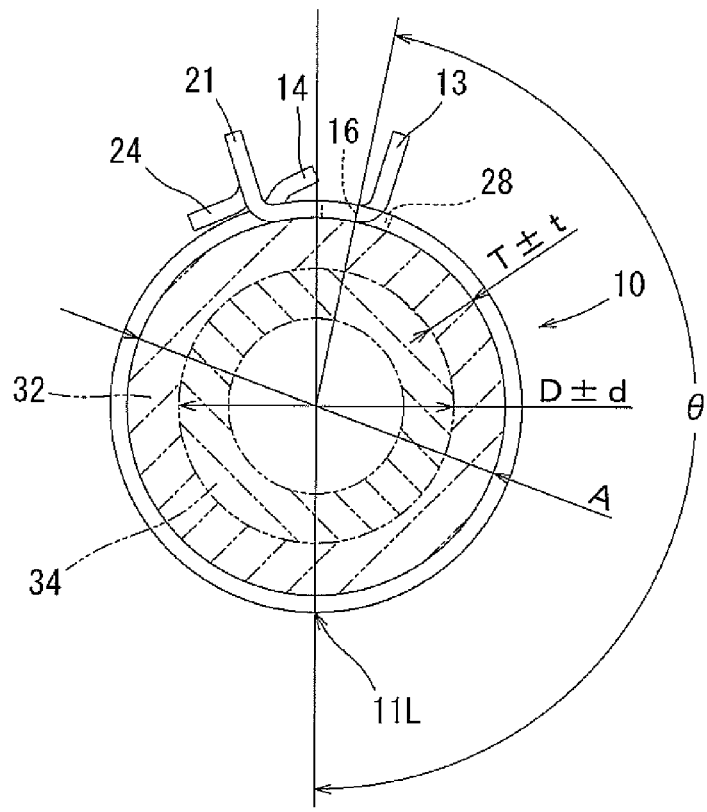
FIG. 9 is a front view showing a hose tightening state of the hose clamp.
Figure 10:
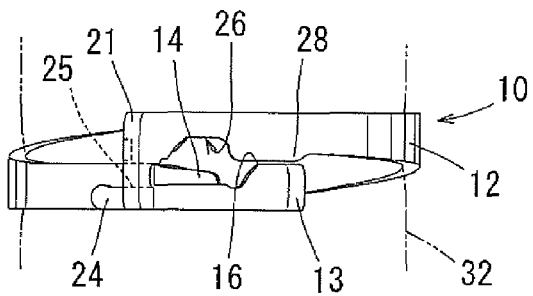
FIG. 10 is a plan view showing the hose tightening state of the hose clamp.

According to the hose clamp 10 described above, during tightening of the hose 32 (refer to FIGS. 9 and 10), both end portions of the clamp body 12, that is, the tip edge (the front end edge) of the leak prevention piece 28 on the second operation piece 21 side and the contact portion 16 on the first operation piece 13 side approximately come into contact with each other in the axial direction of the clamp body 12 (refer to FIG. 10). Further, the leak prevention piece 28 presses along with the clamp body 12 the hose 32 against the connection pipe 34 (refer to FIG. 9). Therefore, a leak flow path which is generated in a portion where surface pressure by the clamp body 12 is low in the gap between both end portions of the clamp body 12 in the hose 32 can be shut off by the pressing of the leak prevention piece 28. In this way, leak of fluid in the hose 32 which is generated during tightening of the hose 32 can be prevented. In addition, it is preferable that the tip edge (the front end edge) of the leak prevention piece 28 and the contact portion 16 come into contact with each other. However, the tip edge (the front end edge) of the leak prevention piece 28 and the contact portion 16 may come close to each other.

Further, during tightening of the hose 32, the contact portion 16 on the first operation piece 13 side approximately comes into contact with the tip edge of the leak prevention piece 28 on the second operation piece 21 side of the clamp body 12 in the form of point contact and the leak prevention piece 28 presses the hose 32. Therefore, leak of fluid in the hose 32 which is generated during tightening of the hose 32 can be prevented by the leak prevention section configured by the leak prevention piece 28 and the contact portion 16.

Further, as shown in FIG. 9, when a range of the wall thickness of the hose 32 during tightening of the hose 32 is set to be T±t, a range of the pipe outer diameter of the connection pipe 34 is set to be D±d, and the inner diameter of the clamp body 12 of the hose clamp 10 is set to be A, a maximum value Amax of the inner diameter A of the clamp body 12 is expressed by an expression, Amax=(D+d)+(T+t)×2. Further, a minimum value Amin of the inner diameter A of the clamp body 12 is expressed by an expression, Amin=(D−d)+(T−t)×2. Therefore, the length Le of the tip edge (the front end edge) of the leak prevention piece 28 is set such that in a range from Amin to Amax of the inner diameter of the clamp body 12, the tip edge (the front end edge) of the leak prevention piece 28 and the contact portion 16 on the first operation piece 13 side can come into point contact with each other (refer to FIG. 2).

Further, if a range corresponding to the length Le of the tip edge (the front end edge) of the leak prevention piece 28 is set to be θ (radian) and a length from the center line 11L of the blank 11 (refer to FIG. 2) to the base end portion 13a of the first operation piece 13 in the hose clamp 10 during tightening of the hose 32 is set to be L, the range θ is expressed by an expression, $(2\pi-2L/Amin)<\theta<(2\pi-2L/Amax)$ (refer to FIG. 9).

Further, there is a case where at the time of release of the engagement of the locking claw 14 on the first operation piece 13 side with the engagement concavity 22 of the second operation piece 21, the first operation piece 13 side is too expanded with respect to the second operation piece 21 side, that is, too pushed back in the opposing direction, that is, forward in the axial direction of the clamp body 12 due to the offset reaction force of the clamp body 12, or the first operation piece 13 side is vigorously too moved in the same direction due to sliding contact of the guide edge 15 on the first operation piece 13 side with respect to the guide edge 27 on the second operation piece 21 side. In such a case, if the hose 32 is tightened to the connection pipe 34 by the hose clamp 10 as it is, the clamp body 12 is obliquely assembled to the hose 32 or the gap between both end portions of the clamp body 12 is enlarged, whereby it is expected that an assembly defect of the clamp body 12 is generated.

Figure 11:
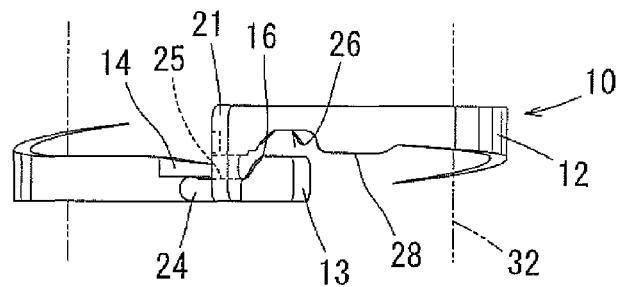
FIG. 11 is a plan view showing an operation of an expansion restricting piece.

However, according to the hose clamp 10, at the time of release of the engagement of the locking claw 14 on the first operation piece 13 side with the engagement concavity 22 of the second operation piece 21, when the first operation piece 13 side is expanded with respect to the second operation piece 21 side, the locking claw 14 on the first operation piece 13 side comes into contact with the expansion restricting piece 24 of the second operation piece 21 (refer to FIG. 11). In addition, FIG. 11 is a plan view showing an operation of the expansion restricting piece.

As shown in FIG. 11, the locking claw 14 on the first operation piece 13 side comes into contact with the expansion restricting piece 24 of the second operation piece 21, whereby the expansion is restricted. For this reason, an assembly defect of the clamp body 12 to the hose 32 is prevented, and thus leak of fluid in the hose 32 due to the assembly defect can be prevented. It can be said that this is effective in a case where in the hose clamp 10 in which a temporarily assembled state is created by making the locking claw 14 be engaged with the engagement concavity 22 in a state where the first operation piece 13 side is offset to the second operation piece 21 side from the neutral state where both the operation pieces 13 and 21 face each other, at the time of release of the engagement of the locking claw 14 with the engagement concavity 22, it is expected that the first operation piece 13 side is expanded with respect to the second operation piece 21 side due to the offset reaction force of the clamp body 12.

Further, each of both the operation pieces 13 and 21 is formed in a one-foot form. Therefore, the hose clamp 10 can be made more compact in the axial direction (the width direction) of the clamp body 12, compared to a case where, for example, the first operation piece 13 is formed in a one-foot form and the second operation piece 21 is formed in a two-foot form.

Figure 12:
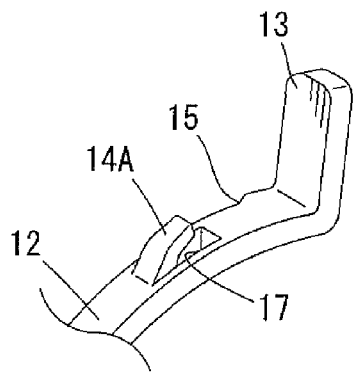
FIG. 12 is a perspective view showing a peripheral portion of a locking claw according to Modified Example 1.
Figure 13:
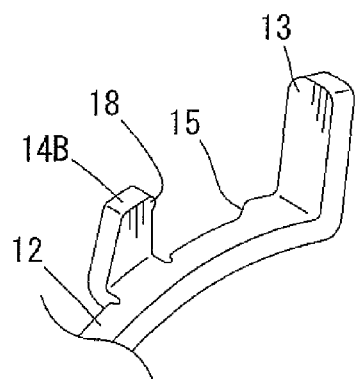
FIG. 13 is a perspective view showing a peripheral portion of a locking claw according to Modified Example 2.
Figure 14:
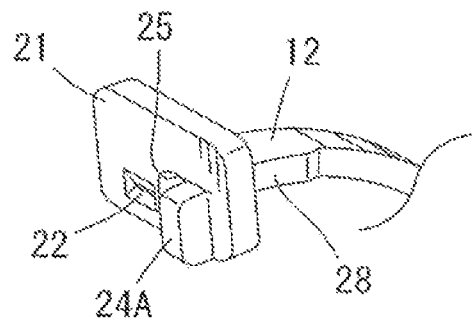
FIG. 14 is a perspective view showing a peripheral portion of an expansion restricting piece according to Modified Example 3.
Figure 15:
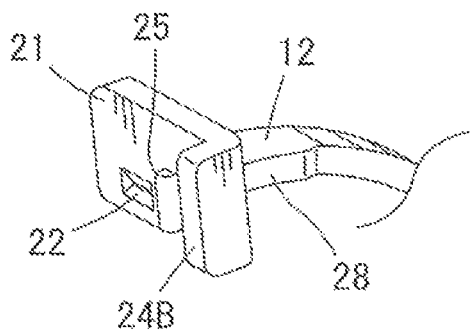
FIG. 15 is a perspective view showing a peripheral portion of an expansion restricting piece according to Modified Example 4.
Figure 16:
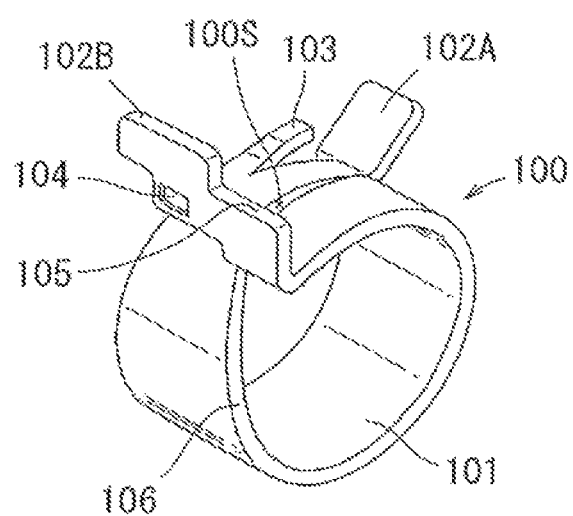
FIG. 16 is a perspective view showing a hose clamp according to an example of the related art.

Next, Modified Examples 1 to 4 of the hose clamp 10 will be described. In addition, FIGS. 12 and 13 are perspective views showing a peripheral portion of a locking claw and FIGS. 14 and 15 are perspective views showing a peripheral portion of an expansion restricting piece.

MODIFIED EXAMPLE 1

Modified Example 1 is a modified example of the locking claw 14 of the hose clamp 10 in the embodiment described above. That is, as shown in FIG. 12, a U-shaped slit 17 is formed in the end portion on the first operation piece 13 side in the clamp body 12 and a claw-shaped portion due to the slit 17 is obliquely raised radially outward, whereby a locking claw 14 (with sign A added thereto) is formed.

MODIFIED EXAMPLE 2

Modified Example 2 is a modified example of the locking claw 14 of the hose clamp 10 in the embodiment described above. That is, as shown in FIG. 13, a locking claw 14 (with sign B added thereto) is formed by bending radially outward a protruding piece which protrudes from the rear edge of the end portion on the first operation piece 13 side in the clamp body 12, in a standing-up shape. At a tip portion of the locking claw 14B, a projection 18 which is engaged with the engagement concavity 22 (refer to FIG. 4) of the second operation piece 21 is formed.

MODIFIED EXAMPLE 3

Modified Example 3 is a modified example of the expansion restricting piece 24 of the hose clamp 10 in the embodiment described above. That is, as shown in FIG. 14, an expansion restricting piece 24 (with sign A added thereto) is formed by bending a protruding piece which protrudes from a side edge portion on the opening groove 25 side of the second operation piece 21 in the clamp body 12, in a standing-up shape.

MODIFIED EXAMPLE 4

Modified Example 4 is a modified example of the expansion restricting piece 24 of the hose clamp 10 in the embodiment described above. That is, as shown in FIG. 15, an expansion restricting piece 24 (with sign B added thereto) is formed by bending a protruding piece which protrudes from the front edge of the second operation piece 21 in the clamp body 12, in a standing-up shape.

Further, technical matters which can be grasped from the above-described embodiment in addition to the technical matters stated in the claims will be described.

(1) The hose clamp according to any one of Claims 1 to 3, wherein the clamp body is maintained in a diameter expansion state by making the locking section on a side of the operation piece on one side be engaged with the engagement portion on a side of the operation piece on the other side in a state where the pair of operation pieces is offset in the opposite directions in the axial direction of the clamp body from a neutral state where the pair of operation pieces faces each other.

(2) The hose clamp according to any one of Claims 1 to 3 and the above (1), wherein a guide mechanism which guides outward in the width direction (in the embodiment, forward) the operation section when making the operation section on one side come close to the operation section on the other side is provided between both end portions of the clamp body.

The invention is not limited to the embodiment described above and a change can be made within a scope which does not depart from the gist of the invention. For example, it is acceptable if the leak prevention section has a configuration in which the leak prevention section approximately comes into contact with an area between both end portions of the clamp body 12 in the axial direction of the clamp body 12 and presses the hose 32 during tightening of the hose 32, and for example, the leak prevention piece 28 may be provided at the end portion on the first operation piece 13 side in place of the end portion on the second operation piece 21 side of the clamp body 12 and may be provided at the end portion on the second operation piece 21 side in place of the end portion on the first operation piece 13 side of the clamp body 12. Further, in the above-described embodiment, the contact portion 16 comes into point contact with the tip edge (the front end edge) of the leak prevention piece 28. However, the contact portion 16 may be formed so as to be able to come into line contact with the tip edge (the front end edge) of the leak prevention piece 28.

Further, it is acceptable if the expansion restricting section has a configuration in which the expansion restricting section restricts expansion in the opposing direction in the axial direction of the clamp body 12 of the operation section on one side with respect to the operation section on the other side between both the operation sections at the time of release of the engagement of the locking claw 14 with the engagement concavity 22, and for example, an expansion restricting section corresponding to the first operation piece 13 side or the end portion on the first operation piece 13 side may be provided on the second operation piece 21 side and an expansion restricting section corresponding to the second operation piece 21 side or the end portion on the second operation piece 21 side may be provided on the first operation piece 13 side.

Further, any one guide edge of both the guide edges 15 and 27 configuring the guide mechanism may be formed as a contact portion capable of coming into contact with the guide edge on the other side in the form of a point contact. Further, it is also possible to omit the guide mechanism. Further, in the above-described embodiment, the second operation piece 21 is formed in a one-foot form. However, the second operation piece 21 may be formed in a two-foot form of a type to make the first operation piece 13 get therethrough. Further, both the guide edges (the guide mechanism) 15 and 27 can also be omitted. Further, the hose clamp 10 may be made of resin in place of metal. Further, the engagement concavity 22 of the second operation piece 21 may be replaced with a locking hole portion which penetrates the second operation piece 21 in a wall thickness direction. Further, a configuration is also possible in which the engagement concavity 22 of the second operation piece 21 is omitted and the second operation piece 21 itself is set as an engagement section.

The invention claimed is:

1. A hose clamp comprising:
   a clamp body formed by bending a strip-shaped leaf spring material into an annular shape defining a central axis, a circumference, and an inner diameter, the clamp body including a first end portion and a second end portion; and
   a first operation section and a second operation section, the first operation section extending in a first radial direction from the first end portion of the clamp body, and the second operation section extending in a second radial direction from the second end portion of the clamp body, the first and second radial directions being perpendicular to the central axis of the clamp body;
   wherein tightening of a hose is made possible by diameter reduction by an elastic restoring force of the clamp body in order to tightly engage the hose with a connection pipe that is inserted into the hose, and the clamp body is expanded in diameter by using elastic deformation by moving the first operation section and the second operation section toward each other,
   a locking section is formed on a side of the first operation section,
   an engagement portion is engaged with the locking section, the engagement portion being selectively disengageable with the locking section and formed on a side of the second operation section,
   the clamp body is maintained in a diameter expansion state by engagement of the locking section with the engagement portion,
   when the clamp body is reduced in diameter from the diameter expansion state, the engagement of the locking section with the engagement portion is released by moving the first operation section toward the second operation section in a circumferential direction and moving the first operation section away from the second operation section in an axial direction, and
   the clamp body is tapered from a center point toward each of the first and the second operation sections, and also comprises a leak prevention section that includes a leak prevention piece and a contact portion, the leak prevention piece protruding axially from a side edge of the second operation section and having a tip edge extending circumferentially along the clamp body, the contact portion formed at a side edge on the first operation section, and
   a length of the tip edge of the leak prevention piece is set such that at least a portion of the leak prevention piece is adjacent and opposite the contact portion when an inner diameter of the hose clamp during tightening is within a predetermined range of a maximum value to a minimum value, the maximum value and the minimum value being determined based on dimensions of the hose and the connection pipe.

2. The hose clamp according to claim 1, further comprising an expansion restricting piece which restricts expansion in the axial direction of the clamp body by restricting axial movement of the first operation section with respect to the second operation section at the time of release of the engagement of the locking section with the engagement portion, the expansion restricting piece being located between opposing sides of the first operation section and the second operation section.

3. The hose clamp of claim 2, wherein the expansion restricting piece and the locking section contact one another at the time of release of the engagement of the locking section with the engagement portion to prevent axial movement of the first operation section with respect to the second operation section.

4. The hose clamp according to claim 1, wherein in an exploded condition of the hose clamp, the first operation section and the second operation section are substantially symmetric with respect to the center point of the exploded hose clamp.

5. The hose clamp of claim 1, wherein the leak prevention piece contacts the contact portion during tightening.

6. The hose clamp according to claim 5, wherein the contact portion contacts the tip edge of the leak prevention piece in the form of at least a point contact.

7. The hose clamp of claim 5, wherein the tip edge of the leak prevention piece contacts the contact piece during tightening.

8. The hose clamp of claim 7, wherein the tip edge of the leak prevention piece contacts the contact piece during tightening and throughout the entire range of the maximum value of the inner diameter to the minimum value of the inner diameter.

9. The hose clamp of claim 1, wherein the leak prevention piece does not contact the contact piece during tightening.

* * * * *